(12) United States Patent
Mitsunobu et al.

(10) Patent No.: US 11,714,916 B2
(45) Date of Patent: Aug. 1, 2023

(54) DEVICE AND METHOD FOR MANAGING PERSONAL DATA

(71) Applicant: FUJITSU LIMITED, Kawasaki (JP)

(72) Inventors: Hideki Mitsunobu, Kawasaki (JP); Junichi Suga, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 145 days.

(21) Appl. No.: 17/325,253

(22) Filed: May 20, 2021

(65) Prior Publication Data

US 2022/0050916 A1 Feb. 17, 2022

(30) Foreign Application Priority Data

Aug. 11, 2020 (JP) ................................. 2020-135690

(51) Int. Cl.
| | |
|---|---|
| *G06F 21/62* | (2013.01) |
| *G06F 21/31* | (2013.01) |
| *G06F 21/79* | (2013.01) |

(52) U.S. Cl.
CPC .......... *G06F 21/6245* (2013.01); *G06F 21/31* (2013.01); *G06F 21/79* (2013.01)

(58) Field of Classification Search
CPC ....... G06F 21/6245; G06F 21/31; G06F 21/79
USPC ....................................................... 726/26
See application file for complete search history.

(56) References Cited

U.S. PATENT DOCUMENTS

| | | | | |
|---|---|---|---|---|
| 6,646,657 | B1* | 11/2003 | Rouser ..................... | G09G 5/00 715/741 |
| 2008/0294896 | A1* | 11/2008 | Noh ..................... | G06F 21/6245 713/168 |
| 2011/0055547 | A1* | 3/2011 | Lee ........................ | H04L 63/102 713/150 |
| 2014/0297695 | A1* | 10/2014 | Dejana .................. | G06F 3/0608 707/812 |
| 2020/0281470 | A1 | 9/2020 | Nakajima et al. | |

FOREIGN PATENT DOCUMENTS

| | | |
|---|---|---|
| JP | 2003-280975 A | 10/2003 |
| JP | 2012-221368 A | 11/2012 |
| JP | 2019-101752 A | 6/2019 |

* cited by examiner

*Primary Examiner* — Jacob Lipman
(74) *Attorney, Agent, or Firm* — Fujitsu Patent Center

(57) ABSTRACT

A data management device manages personal data to which consent information indicating a data user authorized as a receiver has been added. The data management device includes: a cache memory and a processor. When personal data requested by a data user is stored in the cache memory, the processor acquires the requested personal data from the cache memory. When personal data requested by the data user is not stored in the cache memory, the processor acquires the requested personal data from a data holder. The processor decides based on consent information added to the personal data acquired whether to provide the personal data to the data user. When the data management device acquires new personal data from a data holder, the processor decides whether to store the new personal data in the cache memory based on consent information added to the new personal data.

8 Claims, 13 Drawing Sheets

Related Art

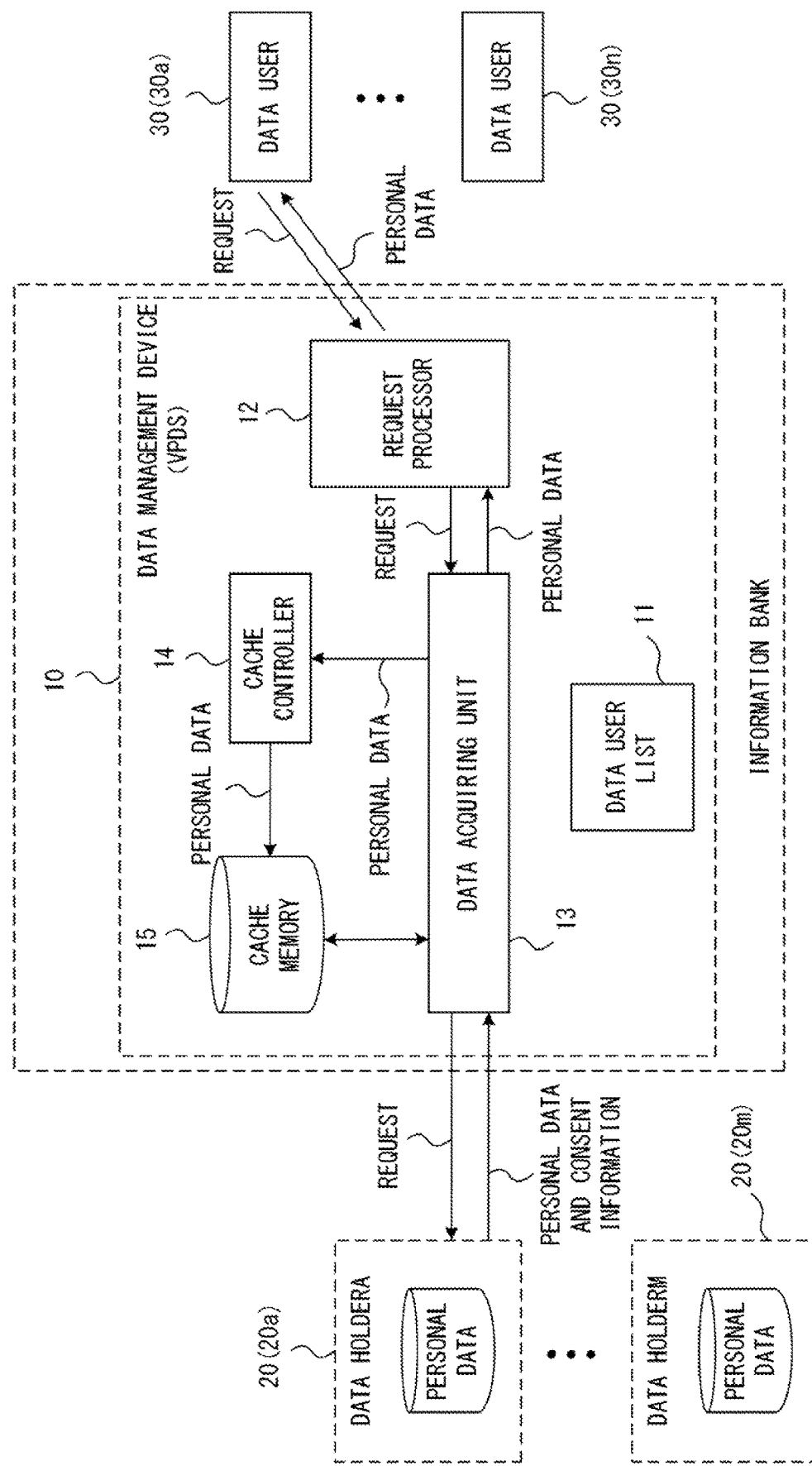
F I G. 2

<DATA USER LIST>

| DATA USER | ATTRIBUTE |
|---|---|
| USER_001 | HOSPITAL |
| USER_002 | RESTAURANT |
| USER_003 | HOSPITAL |
| USER_004 | RETAIL |
| USER_005 | LIFE INSURANCE |
| ⋮ | |
| USER_00N | PUBLIC TRANSPORTATION |

FIG. 3

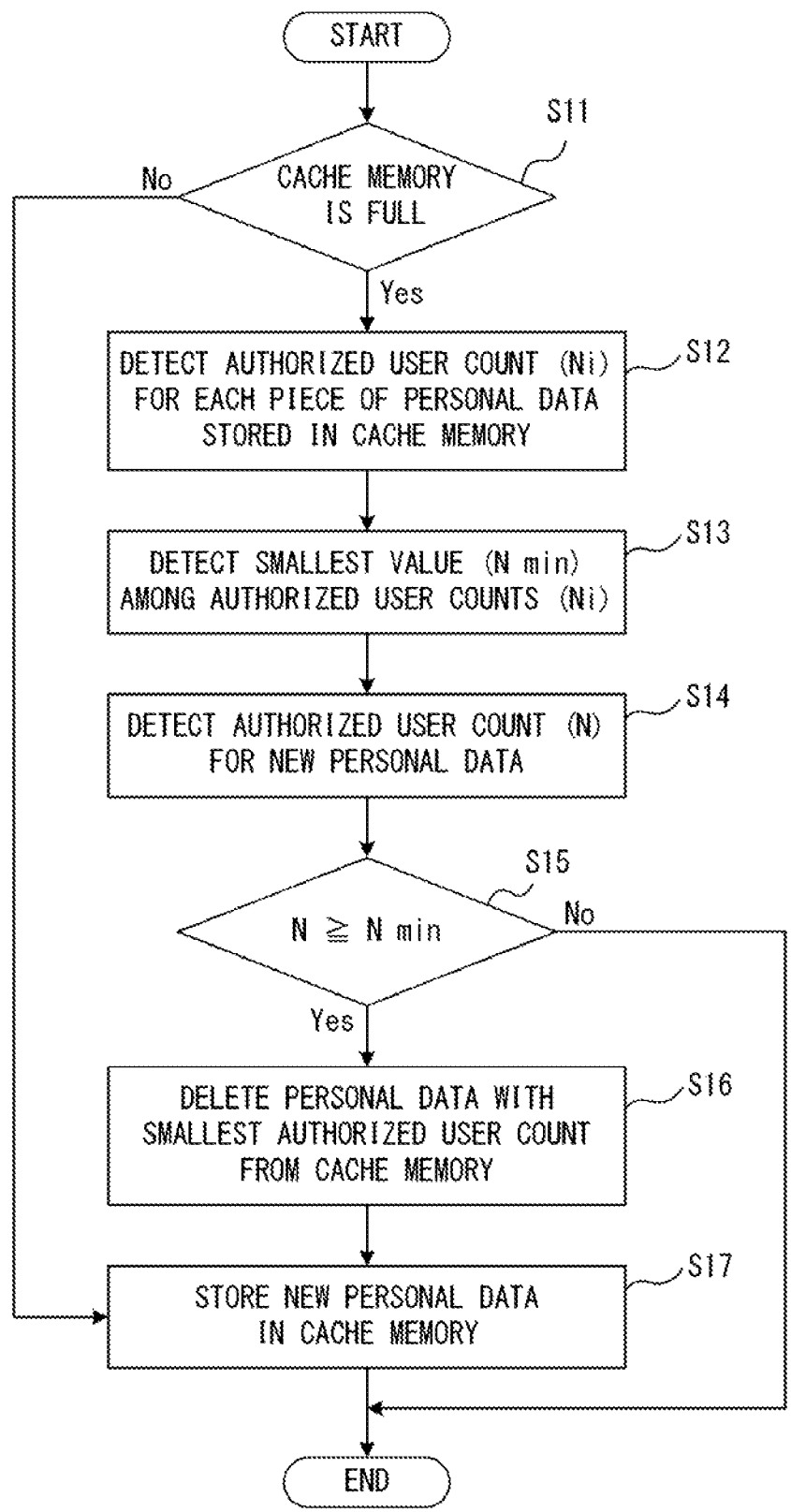
F I G. 6

14a

<CACHE MANAGEMENT TABLE>

| DATA ID | AUTHORIZED USER COUNT |
|---|---|
| DATA_001 | 5 |
| DATA_003 | 30 |
| DATA_004 | 30 |
| DATA_007 | 10 |
| DATA_008 | 15 |
| ⋮ | |
| DATA_OOK | 20 |

F I G. 7

<CACHE MANAGEMENT TABLE>

| DATA ID | AUTHORIZED USER COUNT | PRE-RECEPTION USER COUNT |
|---|---|---|
| DATA_001 | 5 | 4 |
| DATA_003 | 30 | 25 |
| DATA_004 | 30 | 2 |
| DATA_007 | 10 | 5 |
| DATA_008 | 15 | 5 |
| ⋮ | | |
| DATA_00K | 20 | 10 |

14b

F I G. 1 1

DEVICE AND METHOD FOR MANAGING PERSONAL DATA

CROSS-REFERENCE TO RELATED APPLICATION

This application is based upon and claims the benefit of priority of the prior Japanese Patent Application No. 2020-135690, filed on Aug. 11, 2020, the entire contents of which are incorporated herein by reference.

FIELD

The embodiments discussed herein are related to a device and a method for managing personal data.

BACKGROUND

Services using personal data have been widespread in recent years. For example, an information bank may collect personal data from data holders and store the collected personal data in a personal data store (PDS). The information bank provides personal data to a data user in response to his/her request. A data holder can designate a range in which personal data can be provided. In this case, the information bank can provide the personal data to data users within the range designated by the data holder.

FIGS. 1A and 1B illustrate an example of a service provided by an information bank. In the configuration depicted in FIG. 1A, the information bank is provided with a personal data store PDS. The information bank collects personal data from data holders and stores the collected personal data in the personal data store PDS in advance. In response to a request from a data user, the information bank extracts corresponding personal data from the personal data store PDS and provides the extracted personal data to the data user. However, in this configuration, a massive amount of data may be stored in the personal data store PDS. Thus, the information bank needs to be provided with a large-capacity storage device.

This problem can be solved or alleviated by the configuration depicted in FIG. 1B. In particular, the information bank is provided with a virtual personal data store VPDS. The virtual personal data store VPDS stores necessary personal data by using a cache memory system. When personal data requested by a data user is stored in the cache memory, the information bank extracts the personal data from the cache memory and provides the extracted personal data to the data user. When personal data requested by a data user is not stored in the cache memory, the information bank acquires corresponding personal data from a data holder and provides the acquired personal data to the data user. In this case, the personal data acquired from the data holder is stored in the cache memory of the virtual personal data store VPDS.

A proposed cache system is one wherein the frequency of use of a client and the frequency of update on a server are appropriately combined to cache data (e.g., Japanese Laid-open Patent Publication No. 2012-221368). A proposed cache control method is one wherein an expected value for the amount of future increase in the number of requests is determined from the number of requests, and the number of requests obtained when the expected value is maximized is used as a threshold for a cache condition (e.g., Japanese Laid-open Patent Publication No. 2003-280975). A method for identifying whether a user consents to personal data being provided to a third party has been proposed (e.g., Japanese Laid-open Patent Publication No. 2019-101752).

As described above, the virtual personal data store VPDS stores personal data by using a cache memory. When personal data requested by a data user is stored in the cache memory, the personal data is provided from the cache memory to the data user. Thus, the time required to provide data to a data user may be shortened in comparison with the configuration depicted in FIG. 1A.

When the information bank has acquired and provided new personal data to a data user, the information bank stores the personal data in the cache memory. If the cache memory is full in this case, portions of the data stored in the cache memory will be deleted according to a specified algorithm. As an example, the oldest data may be deleted from the cache memory.

The information bank may provide personal data only to data users authorized by the data holder. Thus, there may be no future opportunities for personal data stored in the cache memory to be read from the cache memory. Accordingly, data of little use may occupy the cache memory. In this case, the cache hit ratio may be decreased, thereby leading to a long time to be required to provide data to a data user.

SUMMARY

According to an aspect of the embodiments, a data management device manages personal data to which consent information indicating a data user authorized as a receiver has been added. The data management device includes: a cache memory and a processor. When personal data requested by a data user is stored in the cache memory, the processor acquires the requested personal data from the cache memory. When personal data requested by the data user is not stored in the cache memory, the processor acquires the requested personal data from a data holder. The processor decides based on consent information added to the personal data acquired whether to provide the personal data to the data user. When the data management device acquires new personal data from a data holder, the processor decides whether to store the new personal data in the cache memory based on consent information added to the new personal data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of a data management device in accordance with embodiments of the invention;

FIG. 3 illustrates an example of a data user list;

FIG. 6 is a flowchart illustrating cache control in accordance with a first embodiment;

FIG. 7 illustrates an example of a cache management table used in a first embodiment;

FIG. 11 illustrates an example of a cache management table used in a second embodiment;

DESCRIPTION OF EMBODIMENTS

Figure 1A:
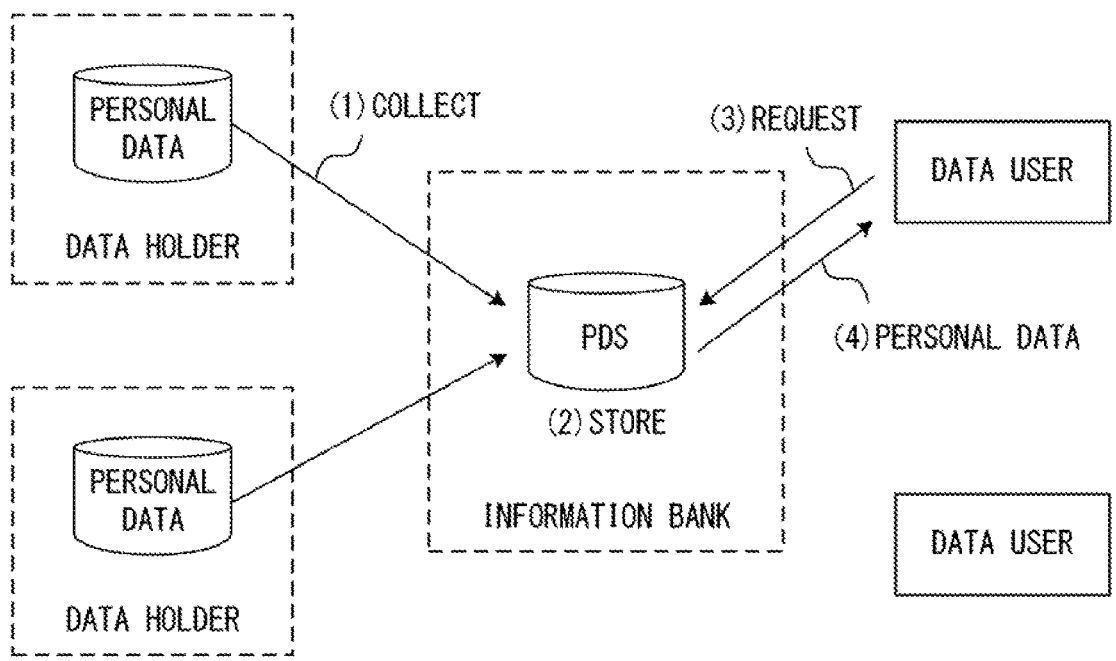
FIGS. 1A and 1B illustrate an example of a service provided by an information bank.

FIG. 2 illustrates an example of a data management device in accordance with embodiments of the invention. In this example, a data management device 10 in accordance with embodiments of the invention provides information bank services. In particular, the data management device 10 can serve as an information bank, acquire personal data from a data holder, and provide the acquired personal data to a data user.

The data management device 10 can access data holder servers 20 (20a-20m) via a network. The data management device 10 may be accessed by data user terminals 30 (30a-30n) via the network.

The data holder server 20 includes a storage device for storing personal data. For example, the personal data may include information indicating a measured value from a health diagnosis. In this case, the personal data includes, for example, age, sex, height, weight, blood-pressure value, blood sugar level, and cholesterol level. The personal data may also be action history information. For example, the personal data may include position information and shopping information.

The data holder server 20 adds consent information to personal data. The consent information indicates a data user authorized as a receiver of personal data.

For example, a data holder A may be a health center. The health center performs a health diagnosis for medical examinees and collects personal data (e.g., age, sex, height, weight, blood-pressure value, blood sugar level, cholesterol level) of each of the medical examinees. In this case, the health center checks with each of the medical examinees as to whether it is acceptable to provide personal data to a life insurance company. Then, the health center extracts medical examinees who have consented providing personal data to the life insurance company. The personal data of the extracted medical examinees is provided (or sold) to, and stored by, the information bank in response to a request from the information bank.

A data holder M may be a mobile communication carrier. The mobile communication carrier collects personal data (in this example, position information) of smartphone users. In this case, the mobile communication carrier checks with each of the smartphone users as to whether it is acceptable to provide personal data to a restaurant. Then, the mobile communication carrier extracts smartphone users who have consented providing personal data to the restaurant. The personal data of the extracted smartphone users is provided (or sold) to, and stored by, the information bank in response to a request from the information bank.

A data user terminal 30 can access the data management device 10 in response to an instruction input from a data user. For example, an information bank service screen may be displayed on a display device of the data user terminal 30.

In this case, the data user can search for desired personal data by using the information bank service screen. Using the information bank service screen, the data user can make a request for the information bank to provide desired personal data.

The data management device 10 includes a data user list 11, a request processor 12, a data acquiring unit 13, a cache controller 14, and a cache memory 15 so as to be operated as the information bank. Note that the data management device 10 may include other circuits or functions that are not depicted in FIG. 2.

Data users to receive information bank services are registered in the data user list 11. For example, a data user may be registered in the data user list 11 by contracting with the information bank. In the example depicted in FIG. 3, data users 001-00N are registered in the data user list 11. Attribute information of each of the data users is also registered in the data user list 11. Attribute information indicates an industry type to which a data user belongs. In the example depicted in FIG. 3, hospital, restaurant, retail, life insurance, public transportation, and the like are registered. For example, attribute information may be reported by a data user.

The request processor 12 receives a request transmitted from a data user terminal 30. In this example, the request transmitted from the data user terminal 30 includes information for identifying a data user and information for identifying personal data required by the data user.

The data acquiring unit 13 acquires personal data corresponding to a request received by the request processor 12. When personal data requested by a data user is stored in the cache memory 15, the data acquiring unit 13 acquires the requested personal data from the cache memory 15. When personal data requested by a data user is not stored in the cache memory 15, the data acquiring unit 13 acquires the requested personal data from a data holder. Assume that the data acquiring unit 13 understands that what personal data is held by each of the data holders. For example, each of the data holders may generate metadata indicating a description of personal data held by the data holder. In this case, the metadata is registered in the information bank (i.e., data management device 10).

When the data acquiring unit 13 has acquired new personal data from a data holder, the cache controller 14 writes the personal data to the cache memory 15. However, the cache controller 14 performs cache control in accordance with an algorithm (descried hereinafter). When the cache memory 15 becomes full, the cache controller 14 deletes personal data stored in the cache memory 15 in accordance with an algorithm (described hereinafter).

The cache memory 15 stores personal data acquired by the data acquiring unit 13. For example, the cache memory 15 may be implemented by a semiconductor memory. However, the cache memory 15 can be implemented any recording medium.

The request processor 12 provides personal data acquired by the data acquiring unit 13 to a data user. However, the request processor 12 decides whether to provide the personal data to the data user according to consent information added to the personal data. In particular, when a data user who has requested personal data is a data user authorized by a consent information added to the personal data, the request processor 12 provides the personal data to the data user. Assume, for example, that the data user 001 indicated in FIG. 3 makes a request for the information bank to provide health data. In this case, the data acquiring unit 13 acquires the health data from the cache memory 15 or a data holder of the health data. Assume that consent information added to the health data authorizes a "hospital" to be provided with the health data. Meanwhile, the request processor 12 detects that the attribute of the data user 001 is "hospital" referring to the data user list 11. In this case, the request processor 12 determines that the health data has been authorized to be provided to the data user 001. Thus the request processor 12 provides the health data to the data user 001. In this way, the data management device 10 provides personal data acquired from a data holder to a data user according to consent information added to the personal data.

Note that the request processor 12, the data acquiring unit 13, and the cache controller 14 may be implemented by a processor system that includes a processor and a memory. In this case, a data management program describing the functions of the request processor 12, the data acquiring unit 13, and the cache controller 14 is stored in the memory. The request processor 12, the data acquiring unit 13, and the cache controller 14 are implemented by the processor executing the data management program. For example, the data management program may be installed in the data management device 10 in advance. Alternatively, the data management program may be stored in a recording medium that can be attached to and detached from the data management device 10. The data management program may also be stored in an application server (not illustrated). In this case, the data management device 10 acquires the data management program from the application server for execution.

Cache Control

Figure 1B:
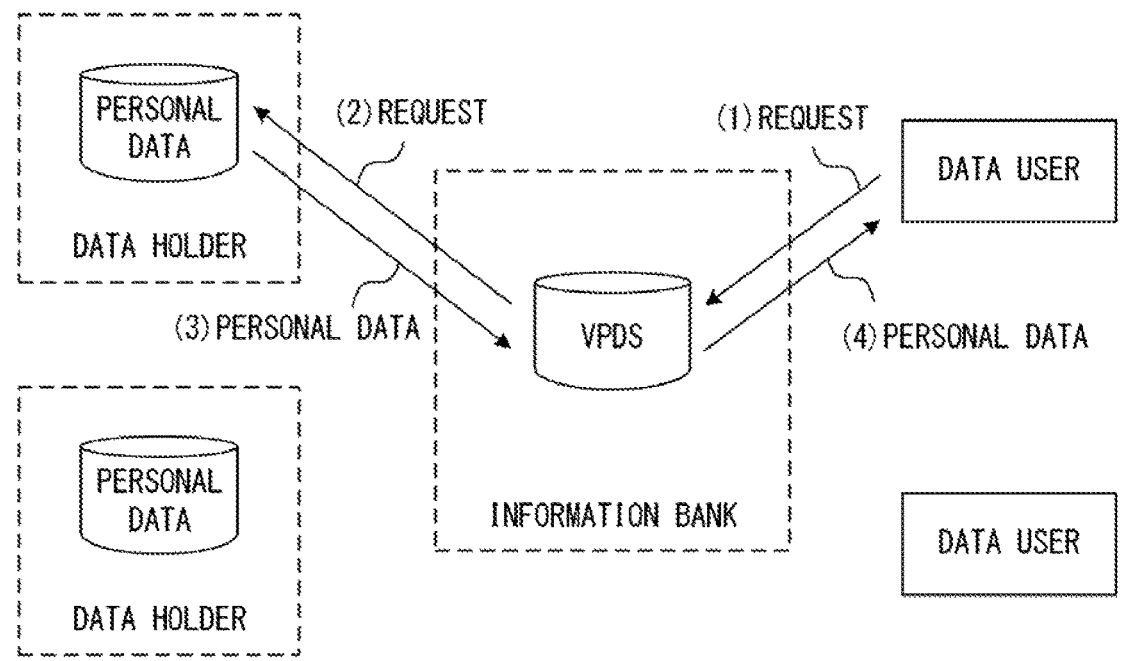

As described above, the data management device 10 provides personal data to a data user by using the cache memory 15. Thus, the data management device 10 includes the virtual personal store VPDS depicted in FIG. 1B. Accordingly, in comparison with the configuration depicted in FIG. 1A, the capacity of the storage device can be decreased, and the time required to provide data can be shortened.

However, the data management device 10 provides personal data only to data users authorized by a data holder. Thus, some personal data stored in the cache memory 15 may not be read from it in the future. In this case, data of little use may occupy the cache memory 15.

Accordingly, the data management device 10 prioritizes storing personal data having a high likelihood of being provided to a data user in the cache memory 15. In this example, personal data is provided only to data users authorized by consent information. Hence, when many data users have been authorized by consent information added to certain personal data, it is inferred that this personal data has a high likelihood of being provided to any of the data users in the future. By contrast, when few data users have been authorized by consent information added to certain personal data, it is inferred that this personal data has a low likelihood of being provided to any of the data users in the future.

Figure 4A:
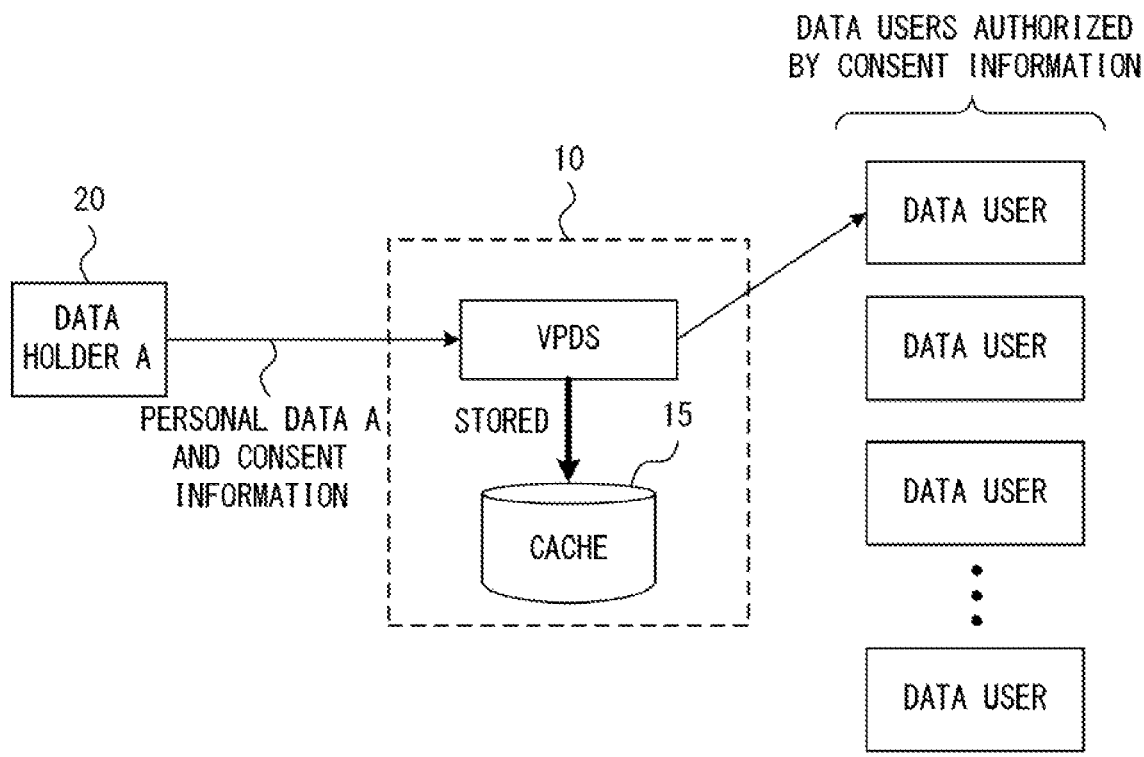
FIGS. 4A and 4B illustrate an example of cache control in accordance with embodiments of the invention.

In the example depicted in FIG. 4A, the data management device 10 acquires personal data A from the data holder A. In response to this, according to the data user list 11 and consent information added to the personal data A, the virtual personal data store VPDS counts the number of data users authorized as receivers of the personal data A. Assume, for example, that the consent information added to the personal data A authorizes "hospital." In this case, the virtual personal data store VPDS counts the number of data users with the attribute "hospital" in the data user list 11. When many data users are authorized as receivers of the personal data A, the virtual personal data store VPDS increases the probability of the personal data A being stored in the cache memory 15. The virtual personal data store VPDS includes the request processor 12, the data acquiring unit 13, and the cache controller 14 depicted in FIG. 2.

Figure 4B:
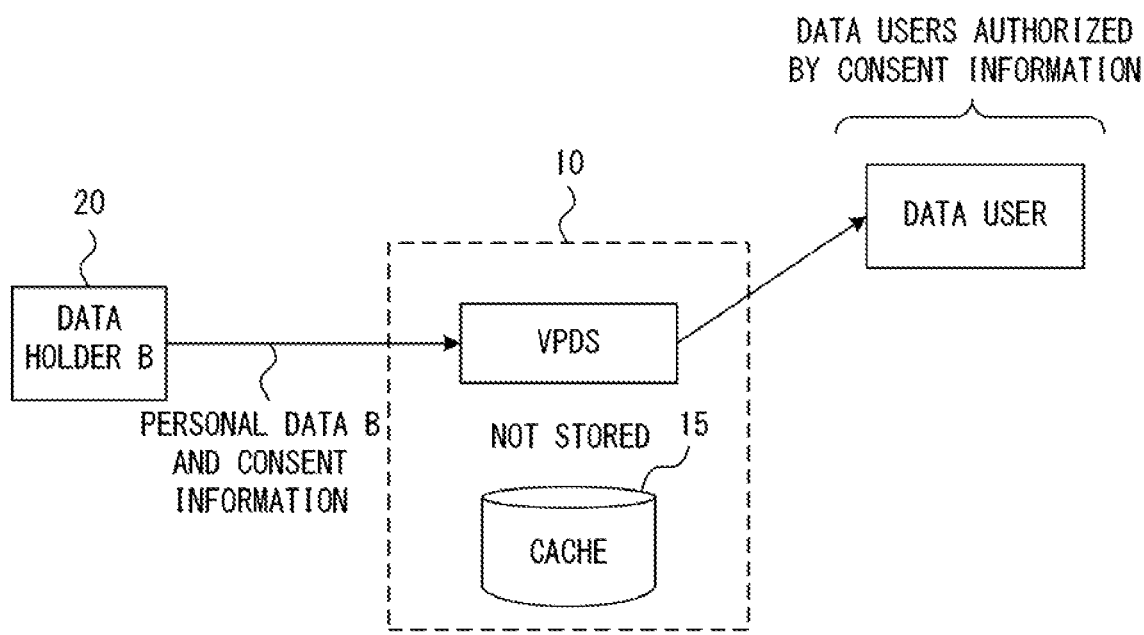

In the example depicted in FIG. 4B, the data management device 10 acquires personal data B from a data holder B. In response to this, according to the data user list 11 and consent information added to the personal data B, the virtual personal data store VPDS counts the number of data users authorized receivers of the personal data B. Assume, for example, that the consent information added to the personal data B authorizes "public transportation." In this case, the virtual personal data store VPDS counts the number of data users with the attribute "public transportation" in the data user list 11. When few data users are authorized as receivers of the personal data B, the virtual personal data store VPDS decreases the probability of the personal data B being stored in the cache memory 15.

As described above, the data management device 10 is such that personal data having a low likelihood of being provided to a data user will be stored in the cache memory 15 with a low probability. In other words, personal data having a high likelihood of being provided to a data user will be stored in the cache memory 15 with a high probability. Thus, a cache hit ratio for a data providing request from a data user is high, thereby shortening a time required to provide data to the data user.

First Embodiment

Figure 5:
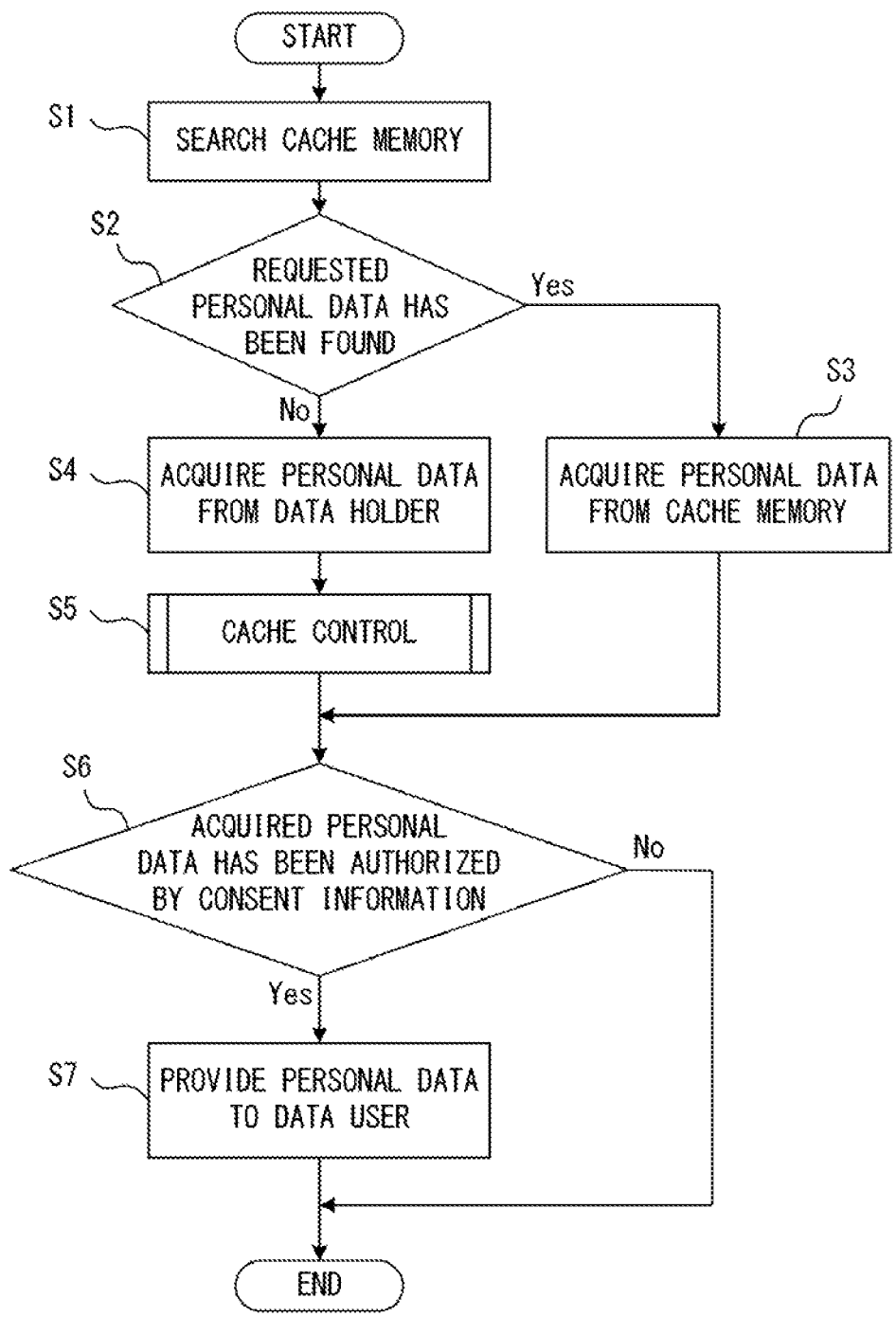
FIG. 5 is a flowchart illustrating an example of a method used by a data management device so as to provide personal data to a data user.

FIG. 5 is a flowchart illustrating an example of a method used by the data management device 10 so as to provide personal data to a data user. The processes of this flowchart are performed when the data management device 10 has received a data providing request from any of the data users. The request received by the data management device 10 includes information for identifying the data user and information for identifying personal data required by the data user. A data user list 11 is created in advance. In addition, the procedure depicted in FIG. 5 is applied not only to the first embodiment but also to second and third embodiments described hereinafter.

In S1-S2, the data acquiring unit 13 decides whether the personal data requested by the data user is stored in the cache memory 15. When the personal data requested by the data user is stored in the cache memory 15, the data acquiring unit 13 acquires the requested personal data from the cache memory 15 in S3. When the personal data requested by the data user is not stored in the cache memory 15, the data acquiring unit 13 acquires the requested personal data from a data holder in S4. Consent information has been added to the personal data acquired by the data acquiring unit 13. The consent information indicates data users authorized as receivers of the personal data. In this example, the consent information may indicate attributes of data users (e.g., hospital, restaurant, retail, life insurance, public transportation).

Upon the data acquiring unit 13 acquiring the new personal data from the data holder, the cache controller 14 performs cache control in S5. The cache control includes a process of deciding whether to write the new personal data acquired by the data acquiring unit 13 to the cache memory 15. Note that the cache control is described hereinafter in detail.

In S6, the request processor 12 decides whether to provide the personal data acquired by the data acquiring unit 13 to the data user. In particular, the request processor 12 decides whether the data user who has requested the personal data has been authorized by the consent information added to the personal data. When the data user who has requested the personal data has been authorized by the consent information, the request processor 12 provides the personal data acquired by the data acquiring unit 13 to the data user in S7. When the data user who has requested the personal data is not authorized by the consent information, the personal data is not provided to the data user.

FIG. 6 is a flowchart illustrating cache control in accordance with the first embodiment. The processes indicated in FIG. 6 are performed in S5 in the flowchart depicted in FIG. 5. Thus, the processes depicted in FIG. 6 are performed when the data acquiring unit 13 has acquired new personal data from a data holder.

In the first embodiment, the cache controller 14 includes a cache management table 14a depicted in FIG. 7. Personal data stored in the cache memory 15 is registered in the cache management table 14a. An authorized user count is recorded in the cache management table 14a for each piece of personal data. An authorized user count indicates the number of data users authorized as receivers of personal data. In the example depicted in FIG. 7, personal data 001 is authorized to be provided to five data users, and personal data 003 is authorized to be provided to thirty data users.

An authorized user count is calculated according to consent information added to personal data and the data user list 11 depicted in FIG. 3. Assume, for example, that consent information added to the personal data A authorizes "hospital" as receivers of the personal data A. In this case, the number of data users with the attribute "hospital" in the data user list 11 is counted. The value obtained from the counting is recorded in the cache management table 14a as an authorized user count for the personal data A.

In S11, the cache controller 14 decides whether the cache memory 15 is full. Every time the cache memory 15 is updated, the cache controller 14 calculates the remaining capacity of the cache memory 15.

When the cache memory 15 is not full, the cache controller 14 stores new personal data in the cache memory 15 in S17. In particular, when the remaining capacity of the cache memory 15 is greater than the size of new personal data, this personal data will be stored in the cache memory 15.

When the cache memory 15 is full, the cache controller 14 detects, in S12, an authorized user count for each piece of personal data stored in the cache memory 15 by referring to the cache management table 14a depicted in FIG. 7. An authorized user count for personal data i may hereinafter be referred to as "Ni." In S13, the cache controller 14 detects the smallest value among the authorized user counts Ni detected in S12. The smallest value among authorized user counts Ni may hereinafter be referred to as "Nmin." In the example depicted in FIG. 7, the smallest value Nmin among the authorized user counts is five.

In S14, the cache controller 14 detects an authorized user count for new personal data. As described above, an authorized user count is calculated according to consent information added to personal data and the data user list 11 depicted in FIG. 3. Thus, the authorized user count for the new personal data is calculated according to consent information added to the personal data and the data user list 11 depicted in FIG. 3. An authorized user count for new personal data may hereinafter be referred to as "N."

An authorized user count is an indicator of the likelihood of personal data being provided to a data user. In particular, personal data with a large authorized user count indicates that the personal data has a high likelihood being provided to any of the data users in the future. By contrast, personal data with a small authorized user count indicates that the personal data has a low likelihood being provided to any of the data users in the future.

In S15, the cache controller 14 compares the authorized user count N for the new personal data with the smallest number Nmin among the authorized user counts for the pieces of personal data stored in the cache memory 15. When the authorized user count N for the new personal data is larger than the smallest value Nmin among the authorized user counts, the cache controller 14 infers that the likelihood of the new personal data being provided to any of the data users is higher than that of the personal data with the smallest authorized user count. That is, it is inferred that the likelihood of the personal data with the smallest authorized user count being provided to any of the data users is lower than that of the new personal data. Accordingly, the cache controller 14 deletes the personal data with the smallest authorized user count from the cache memory 15 in S16. Furthermore, the cache controller 14 stores the new personal data in the cache memory 15 in S17.

When the authorized user count N for the new personal data is equal to the smallest value Nmin among the authorized user counts, it is inferred that the likelihood of the new personal data being provided to any of the data users is equal to that of the personal data with the smallest authorized user count. An effective algorithm in this case will be, as a general rule, such that the new data remains in the cache memory. Accordingly, the cache controller 14 may delete the personal data with the smallest authorized user count from the cache memory 15 in S16, and store the new personal data in the cache memory 15 in S17.

When the authorized user count N for the new personal data is smaller than the smallest value Nmin among the authorized user counts, the cache controller 14 infers that the likelihood of the new personal data being provided to any of the data users is lower than those of all pieces of personal data stored in the cache memory 15. In this case, S16-S17 is not performed. Thus, the personal data stored in the cache memory 15 is not deleted, and the new personal data is not stored in the cache memory 15.

When S17 is performed after S16 is carried out, the cache controller 14 updates the cache management table 14a. In particular, a record corresponding to personal data deleted from the cache memory 15 is deleted from the cache management table 14a, and a record corresponding to new personal data is added to the cache management table 14a.

As described above, the cache control algorithm in accordance with the first embodiment is such that it is decided whether to store personal data in the cache memory 15 according to the likelihood of the personal data being provided to a data user. In particular, when the cache memory 15 is full, new personal data will be stored in the cache memory 15 only when personal data having a lower likelihood of being provided to a data user than the new personal data has been stored in the cache memory 15. Hence, personal data having a low likelihood of being provided to a data user is unlikely to remain in the cache memory 15, so the cache hit ratio for a request from a data user is high. Thus, the use efficiency of the cache memory is high. Moreover, the time required for data to be provided to a data user will be short.

Figure 8:
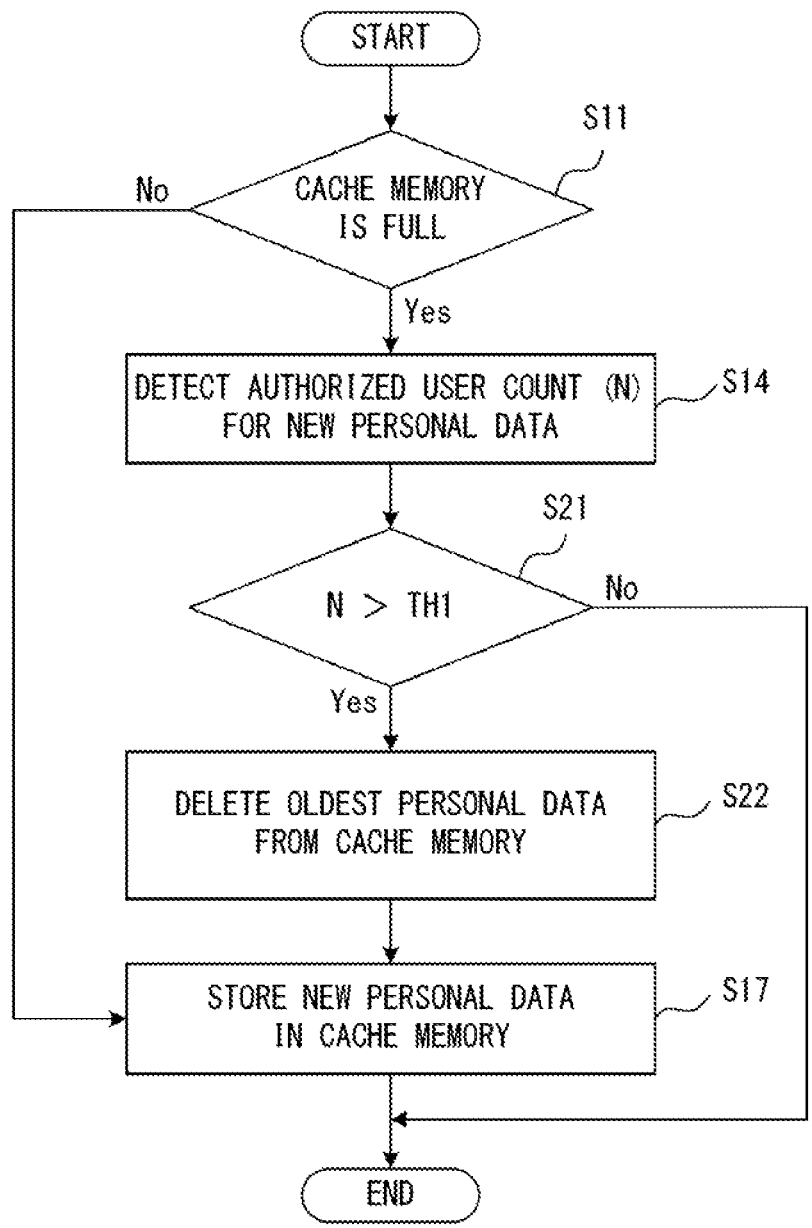
FIG. 8 is a flowchart illustrating a variation of cache control in accordance with a first embodiment.

The cache control in accordance with the first embodiment is not limited to the procedure depicted in FIG. 6. For example, the cache control in accordance with the first embodiment may follow the procedure depicted in FIG. 8. In particular, when the cache memory 15 is full, the cache controller 14 compares an authorized user count N for new personal data with a specified threshold TH1 in S21. When the authorized user count N for the new personal data is greater than the threshold TH1, the cache controller 14 deletes, in S22, the oldest personal data among the personal data stored in the cache memory 15. Then, the cache controller 14 stores the new personal data in the cache memory 15. In this procedure, the cache controller 14 does not need to include the cache management table 14a depicted in FIG. 7.

Second Embodiment

An information bank can handle various types of personal data. For example, profiles of a person (e.g., date of birth, sex, height) may exhibit only little change even after time elapses. In this case, it is considered to be rare that the same data user repeatedly acquires such personal data. Personal data that exhibits no change or only little change may hereinafter be referred to as "fixed personal data."

Figure 9A:
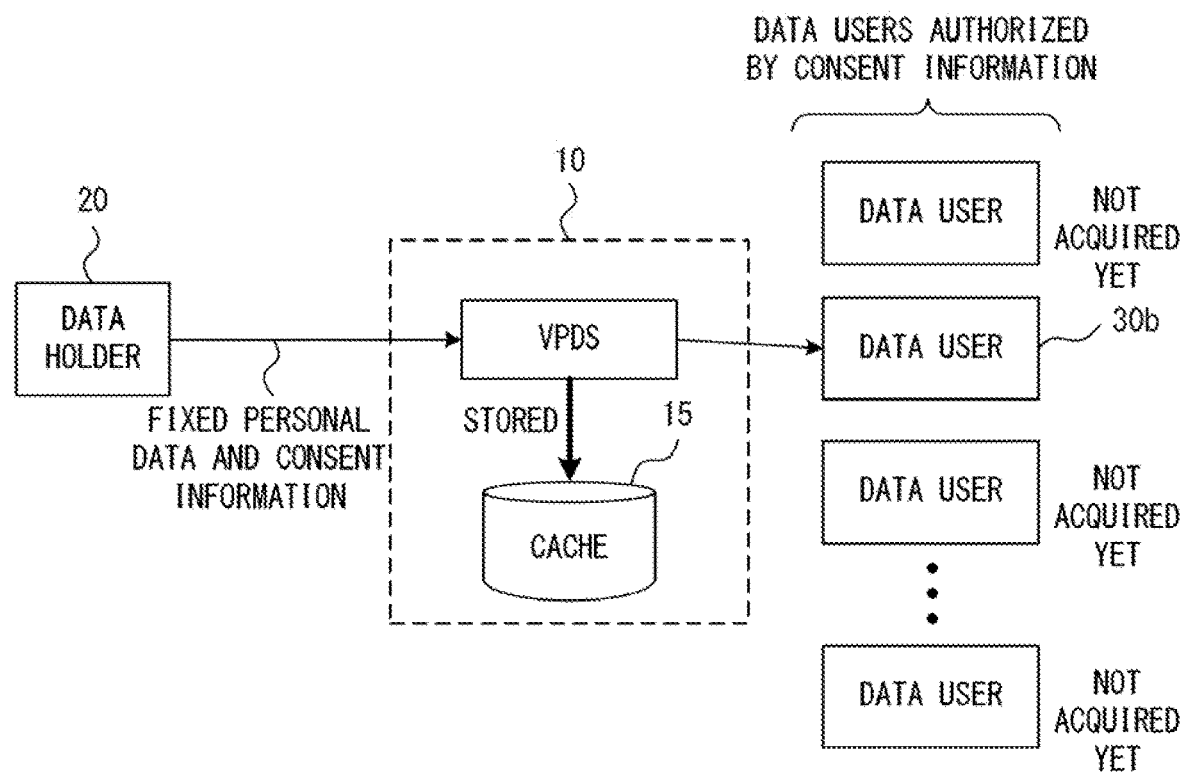
FIGS. 9A and 9B illustrate an example of cache control in accordance with a second embodiment.
Figure 9B:
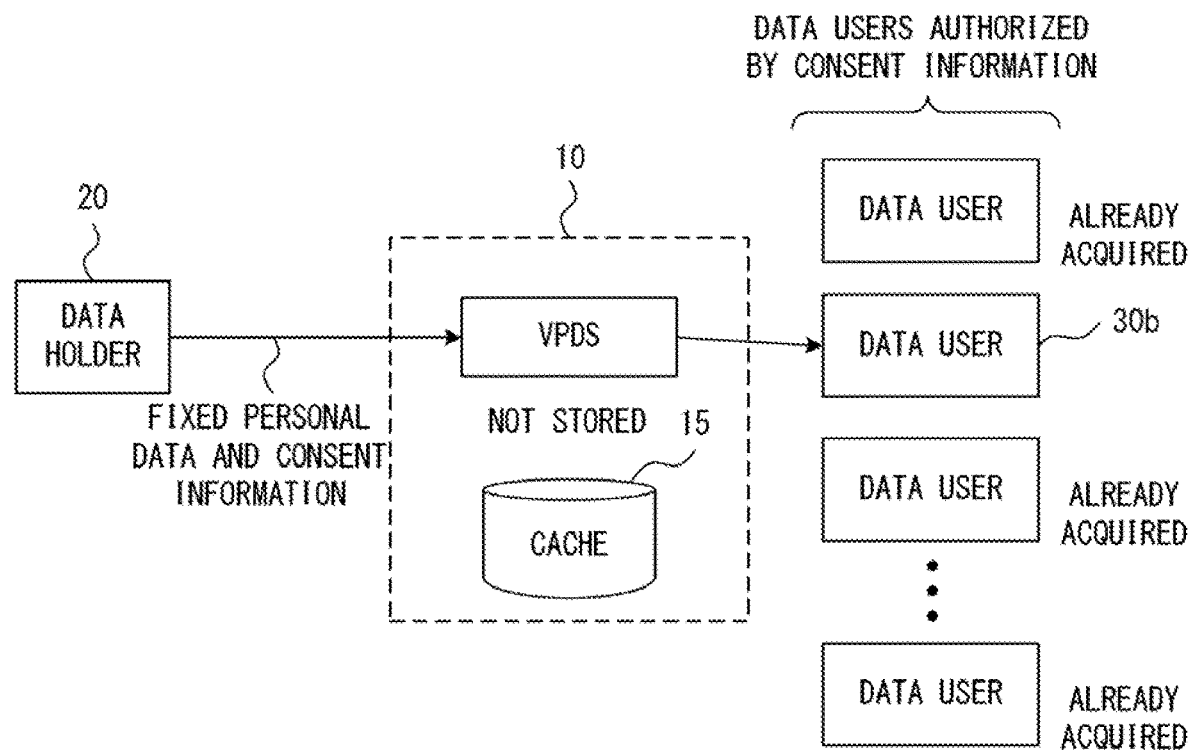

FIGS. 9A and 9B illustrate an example of cache control in accordance with a second embodiment. In this example, the data management device 10 acquires fixed personal data from a data holder and provides the acquired data to a data user.

In the case depicted in FIG. 9A, when the data management device 10 transmits fixed personal data to a data user terminal 30b, the number of data users who have already received the fixed personal data is small. That is, when the data management device 10 transmits the fixed personal data to the data user terminal 30b, the number of data users who have not received the fixed personal data yet is large. In this case, the data management device 10 determines that the fixed personal data has a high likelihood of being requested by many data users in the future and thus stores the fixed personal data in the cache memory 15.

In the case depicted in FIG. 9B, when the data management device 10 transmits fixed personal data to the data user terminal 30b, the number of data users who have already received the fixed personal data is large. That is, when the data management device 10 transmits the fixed personal data to the data user terminal 30b, the number of data users who have not received the fixed personal data yet is small. In this case, the data management device 10 determines that the fixed personal data has a low likelihood of being requested by any of the data users in the future and thus does not store the fixed personal data in the cache memory 15.

As described above, the second embodiment is such that even when the number of data users authorized as receivers of personal data is large, the personal data is not stored in the cache memory 15 when a large proportion of the data users have already acquired the personal data. Hence, since personal data of little use is unlikely to be stored in the cache memory 15, the use efficiency of the cache memory 15 will be high.

Figure 10:
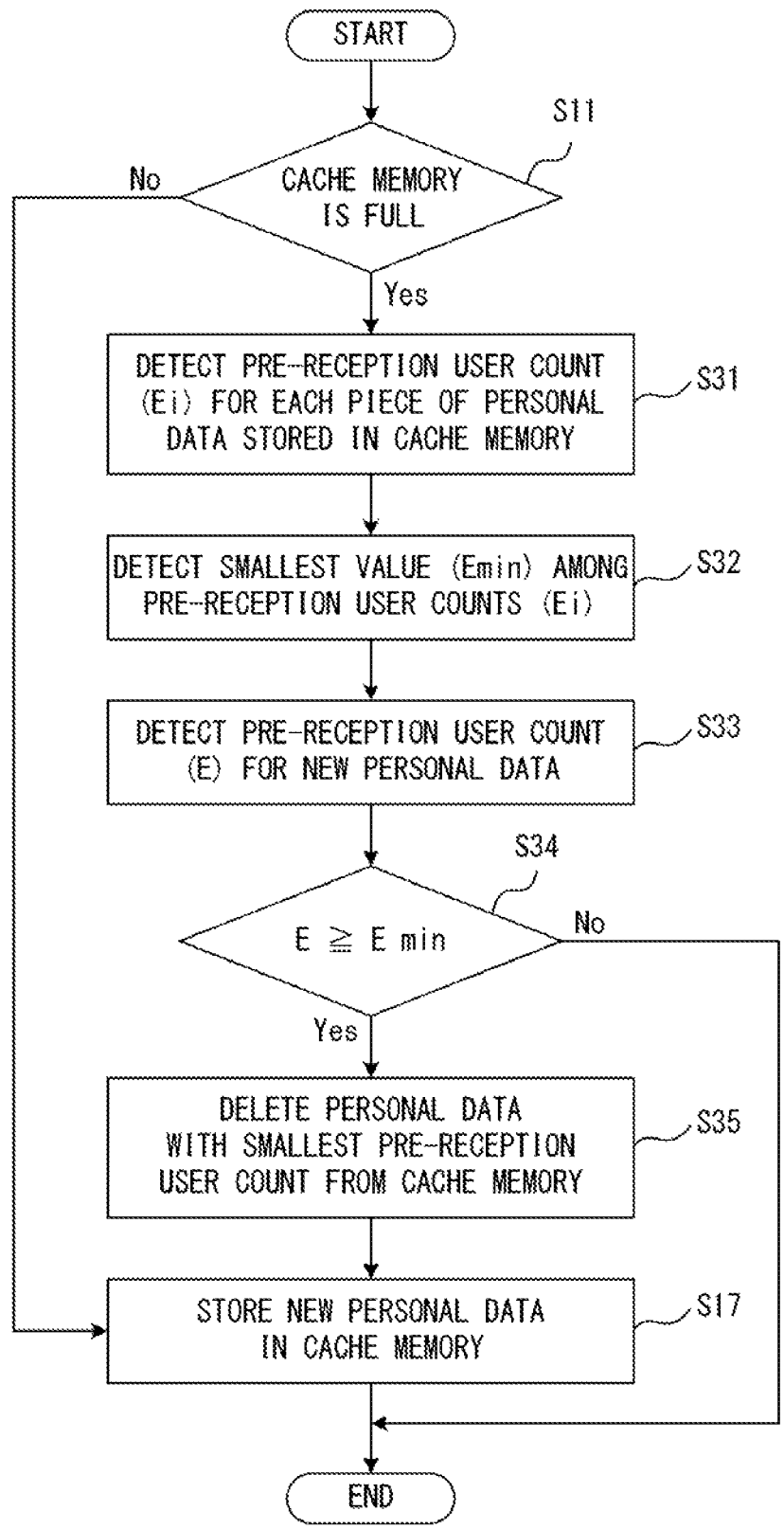
FIG. 10 is a flowchart illustrating cache control in accordance with a second embodiment.

FIG. 10 is a flowchart illustrating cache control in accordance with the second embodiment. The processes depicted in FIG. 10 are performed in S5 in the flowchart depicted in FIG. 5. Thus, the processes depicted in FIG. 10 are performed when the data acquiring unit 13 has acquired new personal data from a data holder. The cache control in accordance with the second embodiment has a similar procedure to the cache control in accordance with the first embodiment depicted in FIG. 6. However, in the cache control in accordance with the second embodiment, S31-S35 are respectively performed instead of S12-S16 depicted in FIG. 6.

In the second embodiment, the cache controller 14 includes a cache management table 14b depicted in FIG. 11. Personal data stored in the cache memory 15 is registered in the cache management table 14b. An authorized user count and a pre-reception user count are recorded in the cache management table 14b for each piece of personal data. The authorized user count in the second embodiment is the same as that in the first embodiment. The pre-reception user count indicates the number of data users who have not received personal data, among the data users authorized as receivers of the personal data. In the example depicted in FIG. 11, personal data 003 has been authorized to be provided to thirty data users, and five of these data users have already been provided with the personal data 003. Hence, the pre-reception user count for the personal data 003 is twenty five. Personal data 004 has been authorized to be provided to thirty data users, and twenty eight of these data users have already been provided with the personal data 004. Hence, the pre-reception user count for the personal data 004 is two.

A pre-reception user count is calculated according to an authorized user count and a data provision log. The data provision log records, for each piece of personal data stored in the cache memory 15, a destination data user and a date and time of transmission. A pre-reception user count is calculated by subtracting "the number of data users who have been provided with corresponding personal data" from an authorized user count. Thus, a pre-reception user count recorded in the cache management table 14b is updated every time personal data is provided to a different data user.

When the cache memory 15 is full, the cache controller 14 detects, in S31, a pre-reception user count for each piece of personal data stored in the cache memory 15 by referring to the cache management table 14b depicted in FIG. 11. A pre-reception user count for personal data i may hereinafter be referred to as "Ei." In S32, the cache controller 14 detects the smallest value among the pre-reception user counts Ei detected in S31. The smallest value among pre-reception user counts Ei may hereinafter be referred to as "Emin." In the example depicted in FIG. 11, the smallest value Emin among the pre-reception user counts is two.

In S33, the cache controller 14 detects a pre-reception user count for new personal data. As described above, a pre-reception user count is calculated according to an authorized user count and a data provision log. A pre-reception user count for new personal data may hereinafter be referred to as "E."

A pre-reception user count is an indicator of the likelihood of corresponding personal data being provided to any of the data users. In particular, personal data with a large pre-reception user count indicates that the personal data has a high likelihood being provided to any of the data users in the future. By contrast, personal data with a small pre-reception user count indicates that the personal data has a low likelihood being provided to any of the data users in the future.

In S34, the cache controller 14 compares the pre-reception user count E for the new personal data with the smallest number Emin among the pre-reception user counts for the pieces of personal data stored in the cache memory 15. When the pre-reception user count E for the new personal data is larger than the smallest value Emin among the pre-reception user counts, the cache controller 14 infers that the likelihood of the new personal data being provided to any of the data users is higher than that of the personal data with the smallest pre-reception user count. That is, it is inferred that the likelihood of the personal data with the smallest pre-reception user count being provided to any of the data users is lower than that of the new personal data. Accordingly, the cache controller 14 deletes the personal data with the smallest pre-reception user count from the cache memory 15 in S35. Furthermore, the cache controller 14 stores the new personal data in the cache memory 15 in S17. When a pre-reception user count E for new personal data is equal to a smallest value Emin, the cache controller 14, as in the first embodiment, may delete the personal data with the smallest pre-reception user count from the cache memory 15 in S35, and store the new personal data in the cache memory 15 in S17.

When the pre-reception user count E for the new personal data is smaller than the smallest value Emin, the cache controller 14 infers that the likelihood of the new personal data being provided to any of the data users is lower than those of the pieces of personal data stored in the cache memory 15. In this case, S35 and S17 are not performed. Thus, the personal data stored in the cache memory 15 is not deleted, and the new personal data is not stored in the cache memory 15.

When S17 is performed after S35 is carried out, the cache controller 14 updates the cache management table 14b. In particular, a record corresponding to personal data deleted from the cache memory 15 is deleted from the cache management table 14b, and a record corresponding to new personal data is added to the cache management table 14b.

As described above, the cache control algorithm in accordance with the second embodiment is such that writing to the cache memory 15 is controlled according to the number of data users who have not acquired personal data yet (i.e., pre-reception user count), among the data users authorized as receivers of the personal data. In particular, the larger the pre-reception user count for new personal data is, the higher likelihood of being provided to data users the personal data is inferred to have. Thus, the new personal data tends to be stored in the cache memory 15. Accordingly, personal data of little use is unlikely to be stored in the cache memory 15. Thus, a cache hit ratio for a request from a data user is high, thereby shortening a time required to provide data to the data user.

In a case where there is no change or little change in the contents of personal data, it is considered to be rare that the same data user repeatedly acquires such personal data. Thus, in this case, the possible number of times personal data will be provided to any of the data users is substantially indicated by the pre-reception user count. Thus, the cache control algorithm in accordance with the second embodiment will be effective especially when providing personal data that would have no or little change in the contents.

Figure 12:
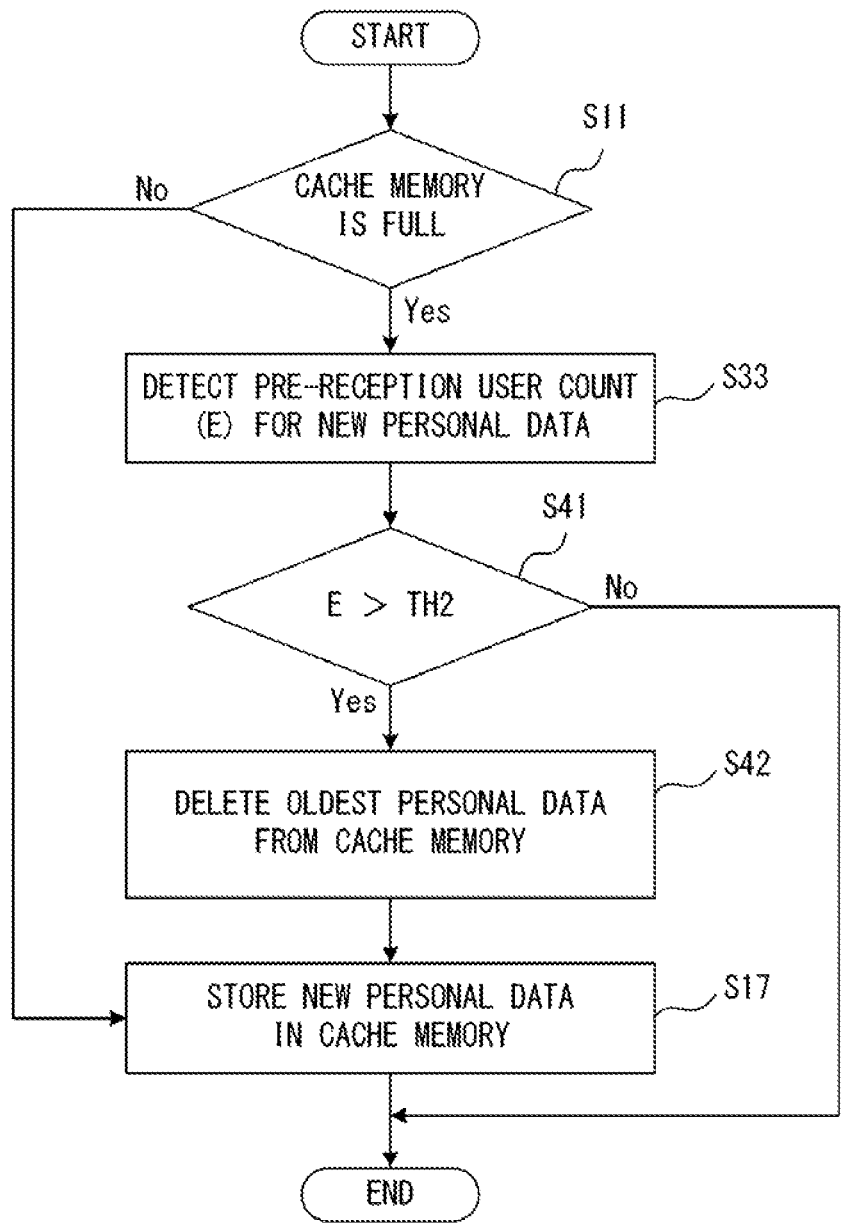
FIG. 12 is a flowchart illustrating a variation of cache control in accordance with a second embodiment.

The cache control in accordance with the second embodiment is not limited to the procedure depicted in FIG. 10. For example, the cache control in accordance with the second embodiment may follow the procedure depicted in FIG. 12. In particular, when the cache memory 15 is full, the cache controller 14 compares a pre-reception user count E for new personal data with a specified threshold TH2 in S41. When the pre-reception user count E for the new personal data is greater than the threshold TH2, the cache controller 14 deletes, in S42, the oldest personal data among the personal data stored in the cache memory 15. Then, the cache controller 14 stores the new personal data in the cache memory 15.

Third Embodiment

In the third embodiment, a cache control algorithm is selected according to the attribute of personal data provided from the data management device 10 to a data user. For example, vehicle driving data or personal data such as movement history may be frequently updated. Meanwhile, a data user preferably acquires the latest personal data. Hence, frequently updated personal data may be repeatedly requested by the same data user. Accordingly, the number of times frequently updated personal data will be provided to any of the data users in the future is considered to have a correlation with the number of authorized data users (i.e., authorized user count). In this case, cache control will preferably be performed using the algorithm in accordance with the first embodiment depicted in FIGS. 6-7.

By contrast, personal data such as age or height is infrequently updated. It is considered to be rare that infrequently updated personal data is repeatedly requested by the same data user. Accordingly, the number of times infrequently updated personal data will be provided to any of the data users in the future is considered to have a correlation with the number of data users who have not acquired the personal data (i.e., pre-reception user count). In this case, cache control will preferably be performed using the algorithm in accordance with the second embodiment depicted in FIGS. 10-11.

Figure 13:
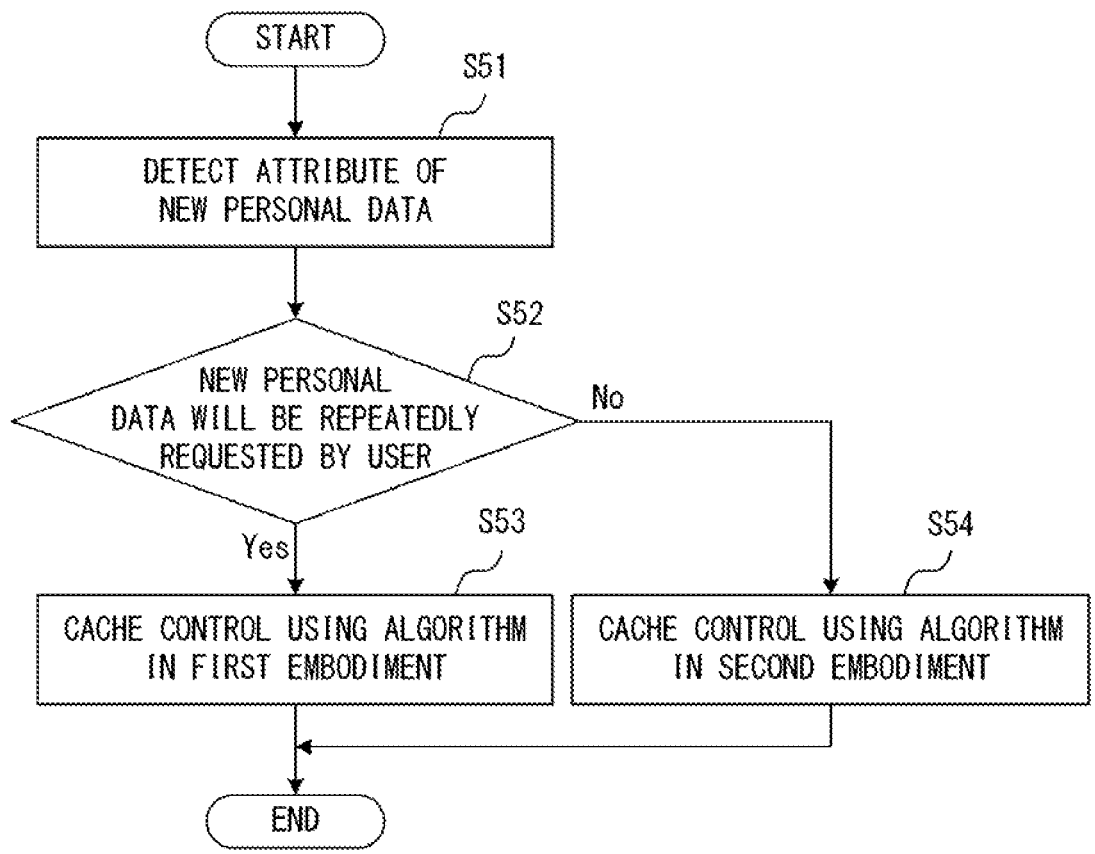
FIG. 13 is a flowchart illustrating cache control in accordance with a third embodiment.

FIG. 13 is a flowchart illustrating cache control in accordance with the third embodiment. The processes depicted in FIG. 13 are performed in S5 in the flowchart depicted in FIG. 5. Thus, the processes depicted in FIG. 13 are performed when the data acquiring unit 13 has acquired new personal data from a data holder.

In S51, the cache controller 14 detects an attribute (e.g., vehicle driving data, movement history, age, height) of the new personal data acquired from the data holder. For example, attribute information indicating the attribute of the personal data may be added to the personal data by the data holder.

In S52, according to the attribute of the new personal data, the cache controller 14 decides whether the personal data has a high likelihood of being repeatedly requested by the same data user. Note that the likelihood of personal data being repeatedly requested by the same data user is estimated in advance in association with the attribute of the personal data.

When the likelihood of the new personal data being repeatedly requested by the same data user is greater than a specified threshold, the cache controller 14 performs, in S53, cache control using the algorithm in the first embodiment depicted in FIG. 6. When the likelihood of the new personal data being repeatedly requested by the same data user is less than the threshold, the cache controller 14 performs, in S54, cache control using the algorithm in the second embodiment depicted in FIG. 10.

As described above, in the third embodiment, a cache control algorithm is selected according to the attribute of personal data provided to a data user. Thus, a cache hit ratio for a request from a data user is high.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A computer-readable non-transitory recording medium having stored therein a data management program for causing a processor to execute a process, the processor being implemented in a device that manages personal data to which consent information indicating an authorized data user has been added, the process comprising:
   acquiring, when personal data requested by a data user is stored in a cache memory, the requested personal data from the cache memory;
   acquiring, when personal data requested by the data user is not stored in the cache memory, the requested personal data from a data holder;
   deciding, based on the consent information added to the personal data acquired from the cache memory or the data holder, whether to provide the personal data acquired from the cache memory or the data holder to the data user; and
   deciding, when new personal data is acquired from a data holder, whether to store the new personal data in the cache memory based on the consent information added to the new personal data,
   the process of deciding whether to store the new personal data in the cache memory includes
      a first process of detecting, based on the consent information added to the new personal data, a first authorized user count indicating a number of data users authorized as receivers of the new personal data, and
      a second process of deciding whether to store the new personal data in the cache memory based on the first authorized user count, and
   in the second process, the new personal data is stored in the cache memory when the first authorized user count is larger than or equal to a smallest value among authorized user counts for pieces of personal data stored in the cache memory.

2. The computer-readable non-transitory recording medium according to claim 1, wherein an algorithm for deciding whether to store the new personal data in the cache memory is selected based on an attribute of the new personal data.

3. A computer-readable non-transitory recording medium having stored therein a data management program for causing a processor to execute a process, the processor being implemented in a device that manages personal data to which consent information indicating an authorized data user has been added, the process comprising:
   acquiring, when personal data requested by a data user is stored in a cache memory, the requested personal data from the cache memory;
   acquiring, when personal data requested by the data user is not stored in the cache memory, the requested personal data from a data holder;
   deciding, based on the consent information added to the personal data acquired from the cache memory or the data holder, whether to provide the personal data acquired from the cache memory or the data holder to the data user; and
   deciding, when new personal data is acquired from a data holder, whether to store the new personal data in the cache memory based on the consent information added to the new personal data, wherein
   the process of deciding whether to store the new personal data in the cache memory includes
      a first process of detecting, based on the consent information added to the new personal data, a first authorized user count indicating a number of data users authorized as receivers of the new personal data, and
      a second process of deciding whether to store the new personal data in the cache memory based on the first authorized user count, and
   in the second process, the new personal data is stored in the cache memory when the first authorized user count is larger than a specified threshold.

4. A computer-readable non-transitory recording medium having stored therein a data management program for causing a processor to execute a process, the processor being implemented in a device that manages personal data to which consent information indicating an authorized data user has been added, the process comprising:
   acquiring, when personal data requested by a data user is stored in a cache memory, the requested personal data from the cache memory;
   acquiring, when personal data requested by the data user is not stored in the cache memory, the requested personal data from a data holder;
   deciding, based on the consent information added to the personal data acquired from the cache memory or the data holder, whether to provide the personal data acquired from the cache memory or the data holder to the data user; and
   deciding, when new personal data is acquired from a data holder, whether to store the new personal data in the cache memory based on the consent information added to the new personal data,
   the process of deciding whether to store the new personal data in the cache memory includes
      a third process of detecting, based on the consent information added to the new personal data, a first pre-reception user count indicating a number of data users who have not been provided with the new personal data yet, among data users authorized as receivers of the new personal data, and
      a fourth process of deciding whether to store the new personal data in the cache memory based on the first pre-reception user count.

5. The computer-readable non-transitory recording medium according to claim 4, wherein
   in the fourth process, the new personal data is stored in the cache memory when the first pre-reception user count is larger than or equal to a smallest value among pre-reception user counts for pieces of personal data stored in the cache memory.

6. The computer-readable non-transitory recording medium according to claim 4, wherein in the fourth process, the new personal data is stored in the cache memory when the first pre-reception user count is larger than a specified threshold.

7. A data management device for managing personal data to which consent information indicating a data user authorized as a receiver has been added, the data management device comprising:
   a cache memory; and
   a processor configured to
      acquire, when personal data requested by a data user is stored in the cache memory, the requested personal data from the cache memory,
      acquire, when personal data requested by the data user is not stored in the cache memory, the requested personal data from a data holder, decide, based on consent information added to the personal data acquired, whether to provide the personal data to the data user, and decide, when the data management device acquires new personal data from a data holder, whether to store the new personal data in the cache memory based on consent information added to the new personal data, in the process to decide whether to store the new personal data in the cache memory, the processor performs a first process of detecting, based on the consent information added to the new personal data, a first authorized user count indicating a number of data users authorized as receivers of the new personal data, and a second process of deciding whether to store the new personal data in the cache memory based on the first authorized user count, and in the second process, the new personal data is stored in the cache memory when the first authorized user count is larger than or equal to a smallest value among authorized user counts for pieces of personal data stored in the cache memory.

8. A data management method for managing personal data to which consent information indicating a data user authorized as a receiver has been added, the data management method comprising:

acquiring, when personal data requested by a data user is stored in a cache memory, the requested personal data from the cache memory;

acquiring, when personal data requested by the data user is not stored in the cache memory, the requested personal data from a data holder;

deciding, based on consent information added to the personal data acquired from the cache memory or the data holder, whether to provide the personal data acquired from the cache memory or the data holder to the data user; and deciding, when new personal data is acquired from a data holder, whether to store the new personal data in the cache memory based on consent information added to the new personal data, the process of deciding whether to store the new personal data in the cache memory includes a first process of detecting, based on the consent information added to the new personal data, a first authorized user count indicating a number of data users authorized as receivers of the new personal data, and a second process of deciding whether to store the new personal data in the cache memory based on the first authorized user count, and in the second process, the new personal data is stored in the cache memory when the first authorized user count is larger than or equal to a smallest value among authorized user counts for pieces of personal data stored in the cache memory.

* * * * *